(12) United States Patent  
Kikuchi et al.

(10) Patent No.: US 6,614,622 B2  
(45) Date of Patent: Sep. 2, 2003

(54) DISC CARTRIDGE SHUTTER OPENING MECHANISM INCLUDING A GUIDE MEMBER, AN OPERATING MEMBER AND A TRANSMISSION MEMBER

(75) Inventors: Shuichi Kikuchi, Miyagi (JP); Rie Izu, Miyagi (JP)

(73) Assignee: Sony Corporation, Tokyo (JP)

( * ) Notice: Subject to any disclaimer, the term of this patent is extended or adjusted under 35 U.S.C. 154(b) by 175 days.

(21) Appl. No.: 09/795,851

(22) Filed: Feb. 28, 2001

(65) Prior Publication Data

US 2001/0019466 A1 Sep. 6, 2001

(30) Foreign Application Priority Data

Mar. 1, 2000 (JP) ........................................ 2000-060450

(51) Int. Cl.⁷ ............................................... G11B 23/03
(52) U.S. Cl. ........................................ 360/133; 369/291
(58) Field of Search ............................ 360/133, 99.02; 369/291

(56) References Cited

U.S. PATENT DOCUMENTS

| | | | |
|---|---|---|---|
| 4,740,949 A | 4/1988 | Davis | 369/291 |
| 5,671,212 A | 9/1997 | Miyazaki et al. | 369/291 |
| 5,856,901 A | 1/1999 | Sumner et al. | 360/133 |
| 6,178,067 B1 * | 1/2001 | Schick et al. | 360/133 |
| 6,205,116 B1 * | 3/2001 | Hashimoto | 369/291 |
| 6,298,034 B1 * | 10/2001 | Hashimoto | 369/291 |
| 6,307,710 B1 * | 10/2001 | Nelson | 360/133 |
| 6,314,080 B1 * | 11/2001 | Watanabe et al. | 369/291 |
| 6,459,677 B1 * | 10/2002 | Shiomi et al. | 369/291 |

FOREIGN PATENT DOCUMENTS

| | | |
|---|---|---|
| EP | 0 973 163 | 1/2000 |
| JP | 9-171668 A * | 6/1997 |
| JP | 2000-57733 A * | 2/2000 |
| WO | WO 83 04136 | 11/1983 |

OTHER PUBLICATIONS

Patent Abstracts of Japan vol. 1997, No. 03, Mar. 31, 1997 (1997-03-31) & JP 08 306151 A (Hitachi Maxell Ltd), Nov. 22, 1996 (1996-11-22).
Patent Abstracts of Japan vol. 011, No. 151 (P-576), May 16, 1987 (1987-05-16) & JP 61 284886 A (Nippon Kogaku KK), Dec. 15, 1986 (1986-12-15).
Patent Abstract of Japan vol. 1999, No. 03, Mar. 31, 1999 (1999-03-31) & JP 10 334629 A (Sony Corp), Dec. 18, 1998 (1998-12-18).
Patent Abstracts of Japan vol. 011, No. 389 (P-648), Dec. 19, 1987 (1987-12-19) & JP 62 154390 A (Matsushita Graphic Commun Syst Inc), Jul. 9, 1987 (1987-07-09).

* cited by examiner

Primary Examiner—Jefferson Evans
(74) Attorney, Agent, or Firm—Frommer Lawrence & Haug LLP; William S. Frommer

(57) ABSTRACT

To provide a new shutter open/close mechanism suitable for use with a cartridge body (6) whose front end is formed in an arbitrary shape for easily knowing a correct direction of insertion in a recorder/player, a guide recess (36) to support a shutter plate (25) movably is formed on a main side of the cartridge body (6) to be oblique relative to the width of the cartridge body (6). The shutter open/close mechanism (26) includes a guide member (31) supporting the shutter plate (25) and movably engaged in the guide recess (36), an operating member (32) to move the guide member (31), a transmission member (33) connecting the guide member (31) and operating member (32) to each other to transmit an operating force from the operating member (32) to the guide member (31), and support surfaces (37) formed on the cartridge body (6) to support the operating member (32) movably. The transmission member (33) is pivotably connected to the guide and operating members (31) and (32).

6 Claims, 12 Drawing Sheets

DISC CARTRIDGE SHUTTER OPENING MECHANISM INCLUDING A GUIDE MEMBER, AN OPERATING MEMBER AND A TRANSMISSION MEMBER

BACKGROUND OF THE INVENTION

1. Field of the Invention

The present invention relates to a disc cartridge having encased therein a disc-shaped recording medium such as an optical disc, magneto-optical disc or the like.

2. Description of the Related Art

As the disc-shaped recording medium, a disc cartridge having a magneto-optical disc for example encased therein has been proposed.

Referring now to FIG. 1, there is schematically illustrated a conventional disc cartridge in the form of a perspective view. In FIG. 1, the disc cartridge is generally indicated with a reference 101. The disc cartridge 101 includes a cartridge body 106 consisting of a pair of upper shell 111 and lower shell 112 assembled to each other. These upper and lower shells 111 and 112 are made of a resin material. Each of the upper and lower shells 111 and 112 has formed therein an access opening 115 having a generally rectangular shape. The access openings 115 are opposite to each other. Thus, a part of the recording area of the magneto-optical disc 105, extending between lead-in and lead-out areas, is exposed to outside through the openings 115 for data read and write.

The lower shell 112 of the cartridge body 106 has formed therein adjacent or next to the access opening 115 an opening 117 through which a disc table (not shown) of a disc drive mechanism which drives to rotate the magneto-optical disc 105 comes into the cartridge body 106.

Further, the cartridge body 106 has a shutter member 120 mounted thereon as shown in FIG. 1. Normally, the shutter member 120 covers or closes the access openings 115 and drive opening 117. When the disc cartridge 101 is loaded into a recorder/player, the shutter member 120 will be moved to open the access and drive openings 115 and 117. The shutter member 120 consists of an upper shutter portion which closes and opens the access opening 115 in the upper shell 111, a lower shutter portion which closes and opens the access opening 115 and drive opening 117 in the lower shell 112, and a connection to which each of the upper and lower shutter portions is connected at one end thereof.

When the disc cartridge 101 constructed as in the above is loaded into the recorder/player, the shutter member 120 is moved by a shutter open/close member of the recorder/player to open the access openings 115 and drive opening 117. The disc table of the disc drive mechanism (not shown) of the recorder/player comes into the disc cartridge through the drive opening 117 to rotate the magneto-optical disc 105 in the disc cartridge 101, while the write/read head of the recorder/player comes into the disc cartridge 101 through the access openings 115 to write/read information to/from the magneto-optical disc 105.

In the aforementioned conventional disc cartridge 101, however, since the front end thereof at which the disc cartridge 101 is first inserted into and removed from the recorder/player is formed straight perpendicularly to the direction of insertion into the recorder/player and both the main sides of the cartridge body 106 are formed generally square, it is difficult to easily know the correct inserting direction of the disc cartridge 101 from its appearance.

Therefore, the conventional disc cartridge 101 is likely to be inserted in a wrong direction into the recorder/player.

OBJECT AND SUMMARY OF THE INVENTION

It is therefore an object of the present invention to overcome the abovementioned drawbacks of the prior art by providing a disc cartridge having a body whose front end to be opposite to a recorder/player may be designed to have an arbitrary shape for easy knowing of a correct direction of insertion into the recorder/player and provided with a shutter open/close mechanism suitable for use with the cartridge body having the arbitrarily shaped front end.

The above object can be attained by providing a disc cartridge including according to the present invention a disc-shaped recording medium; a cartridge body having formed therein a disc compartment to house the disc-shaped recording medium; an access opening formed in the cartridge body and through which a part of the recording area of the disc-shaped recording medium, extending between lead-in and lead-out areas, is exposed to outside for data read and write; a shutter member provided movably to open and close the access opening; and a shutter open/close mechanism having a guide recess to support the shutter member movably. The guide recess of the shutter open/close mechanism is formed on a main side of the cartridge body to be oblique relative to the width of the cartridge body. The shutter open/close mechanism includes a guide member supporting the shutter member and movably engaged in the guide recess, an operating member to move the guide member, a transmission member linking the guide member and the operating member to each other to transmit an operating force from the operating member to the guide member, and support surfaces formed on the cartridge body to support the operating member movably. The transmission member is pivotably connected to the guide member and/or operating member.

In the disc cartridge constructed as in the above, when the shutter open/close member moves the shutter member, the operation member is operated. The guide member is moved along the guide recess by the transmission member which transmits the operating force from the operating member to the transmission member and thus the shutter member opens and closed the access opening. When transmitting the operating force from the operating member to the guide member, the transmission member is pivoted relative to the operating member and/or guide member.

In the above disc cartridge according to the present invention, the guide recess formed on a main side of the cartridge body to be oblique relative to the width of the cartridge body allows the front end of the cartridge body at which the disc cartridge is first inserted into the recorder/player to be formed in an arbitrary shape for easily knowing a correct direction of insertion in the recorder/player, so that the disc cartridge can be prevented from being inserted in a wrong direction into the recorder/player. Also, the shutter open/close mechanism suitable for use on the cartridge body whose front end is formed in the arbitrary shape permits the shutter member to positively open and close the access openings.

These objects and other objects, features and advantages of the present intention will become more apparent from the following detailed description of the preferred embodiments of the present invention when taken in conjunction with the accompanying drawings.

DETAILED DESCRIPTION OF THE PREFERRED EMBODIMENTS

Figure 1:
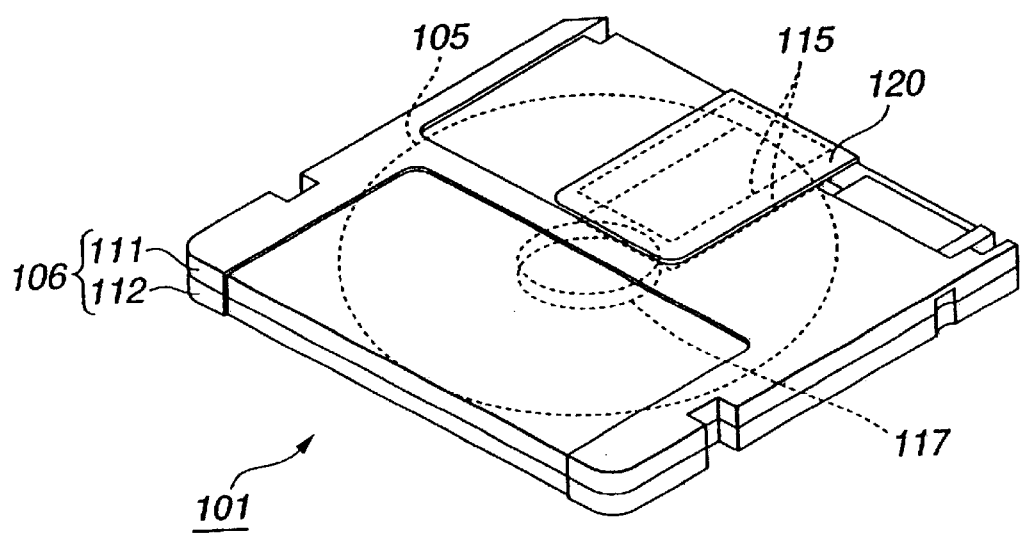
FIG. 1 is a perspective view of a conventional disc cartridge.
Figure 2:
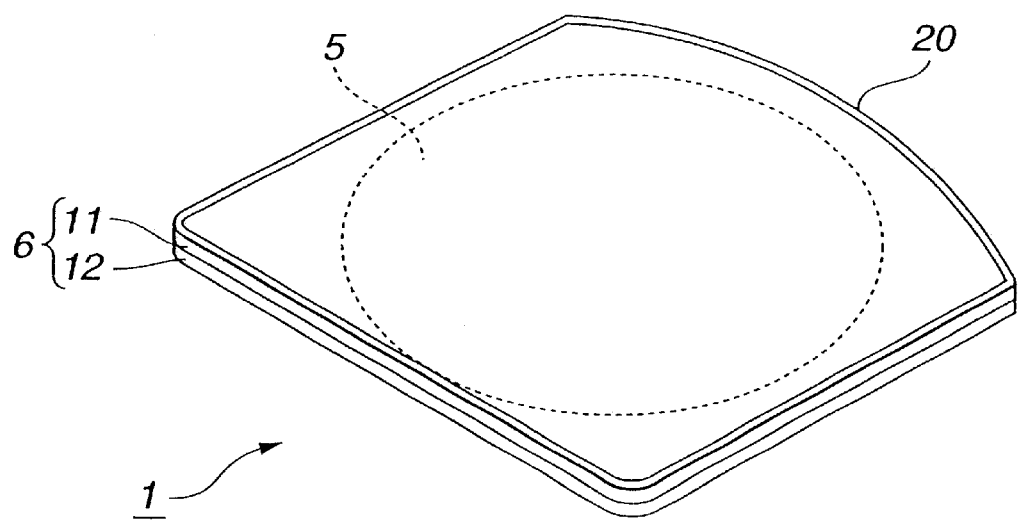
FIG. 2 is a perspective view of an embodiment of the disc cartridge according to the present invention.
Figure 3:
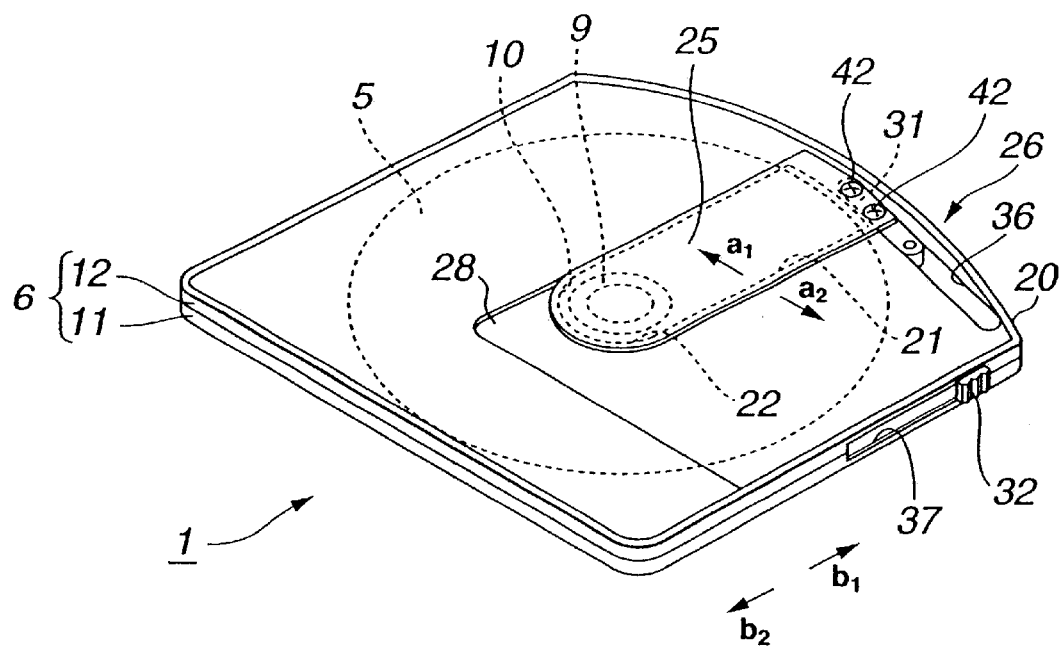
FIG. 3 is a perspective bottom view of the disc cartridge in FIG. 2.

Referring now to FIGS. 2 and 3, there is schematically illustrated in the form of a perspective view the embodiment of the disc cartridge according to the present invention. The disc cartridge is generally indicated with a reference 1. As shown, the disc cartridge 1 includes an optical disc 5 and a cartridge body 6 having the optical disc 5 rotatably encased therein.

Figure 4:
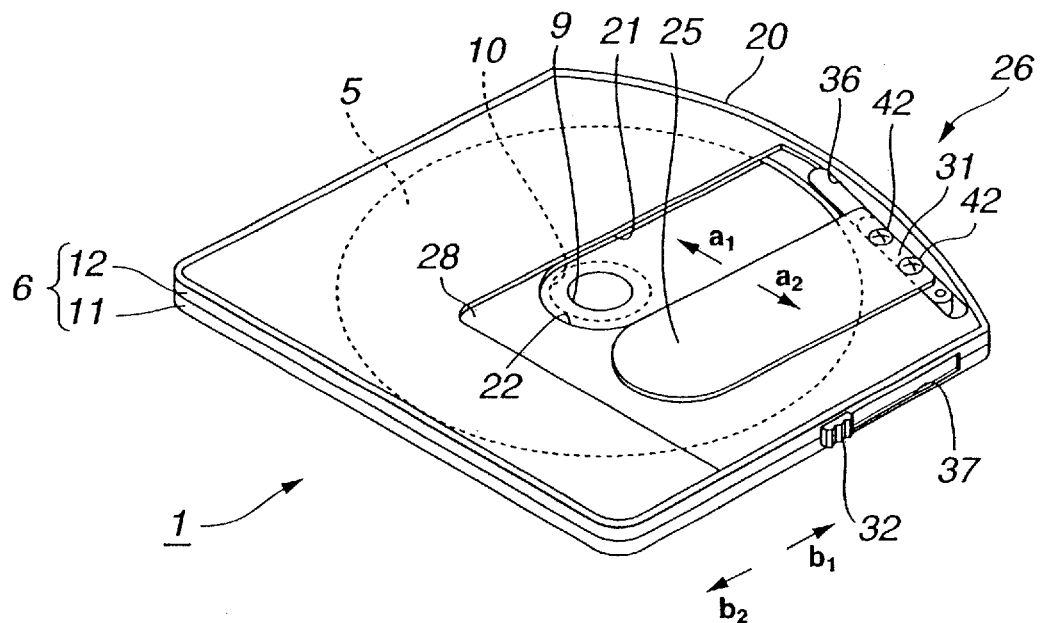
FIG. 4 is a perspective bottom view of the disc cartridge in FIG. 2, with the shutter plate being moved to the opened position.

As will seen from FIGS. 2, 3 and 4, the optical disc 5 is formed to have a disc-like form having a central hole 9. The optical disc 5 used herein is a CD (compact disc)-R (recordable) to which information can additionally be written, for example. It should be noted that the optical disc 5 may of course be an other optical disc such as a phase-change optical disc, magneto-optical disc or the like, which is a CD-RW (rewritable) in which information can be rewritable.

Figure 5:
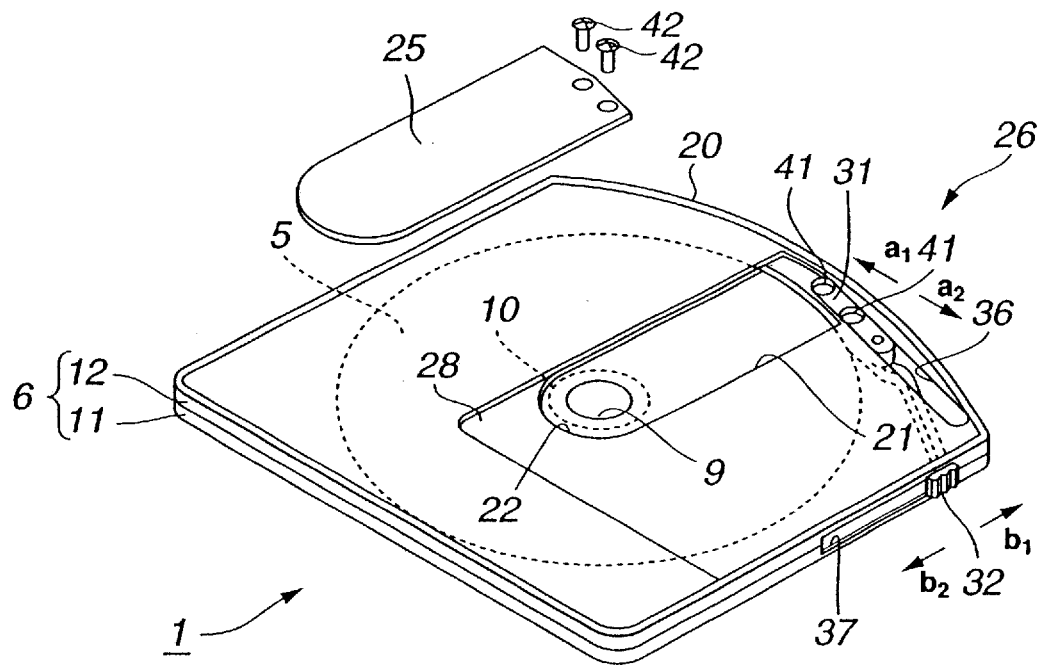
FIG. 5 is an exploded perspective bottom view of the disc cartridge in FIG. 2, for explanation of the shutter plate of the disc cartridge.
Figure 6:
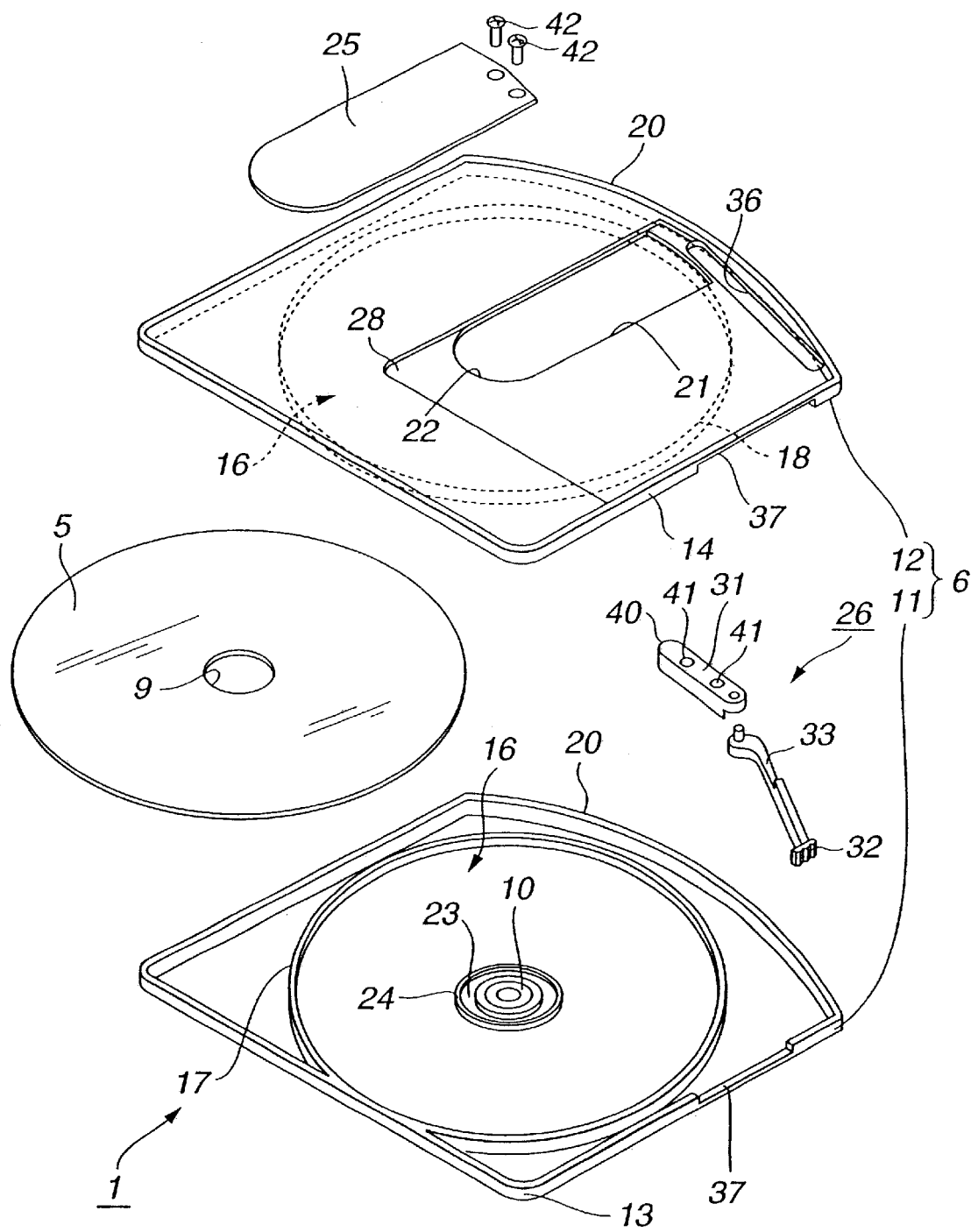
FIG. 6 is an exploded perspective bottom view of the disc cartridge in FIG. 2.

As shown in FIGS. 5 and 6, the cartridge body 6 consists of a pair of upper shell 11 and lower shell 12, assembled to each other. The upper and lower shells 11 and 12 are formed in the general shape of a box by injection molding of a resin such as polycarbonate. Note that the upper and lower shells 11 and 12 may be formed, in addition to polycarbonate, from a thermoplastic resin such as polystyrene, high-impact polystyrene, acryl styrol, acryl butyl styrol, polypropylene, denatured PPO (polyphenylene oxide) or the like.

As best shown in FIG. 6, the upper shell 11 and lower shell 12 has upright walls 13 and 14 formed along the respectively circumferences thereof. The upright circumferential walls 13 and 14 are made to abut each other to form the circumferential wall of the cartridge body 6 as shown in FIG. 6.

As shown in FIG. 6, each of the upper and lower shells 11 and 12 has formed in the inner side thereof a circular disc compartment 16 whose diameter is slightly larger than that of the optical disc 5 and in which the optical disc 5 is rotatably housed. The disc compartment 16 is formed, as shown in FIG. 6, by assembling circular upright walls 17 and 18 formed on the inner sides of the upper and lower shells 11 and 12. The upright walls 17 and 18 are generally as high as the circumferential upright walls 13 and 14 of the upper and lower shells 11 and 12. Thus, the upright circular walls 17 and 18 isolate the disc compartment 16 in which the optical disc 5 is housed from the other inner space of the cartridge body 6.

Of the circumferential upright walls 13 and 14 of the upper and lower shells 11 and 12, only front ends 20 at which the disc cartridge 1 is to be first inserted into a recorder/player are formed generally circular as shown in FIGS. 2, 3 and 6. Therefore, because of the circular front end 20 of the cartridge body 6, he will easily know visually and by touching in which direction he should insert the disc cartridge into the recorder/player. Namely, the user will not insert the disc cartridge 1 in any wrong direction into the recorder/player. Note that the front end 20 may be formed to have a polyhedral shape or to be a combination of a curve and plane.

Also, the lower shell 12 has formed in the main side thereof a generally rectangular access opening 21 through which a write/read mechanism (not shown) of the recorder/player is to face the optical disc 5, as shown in FIG. 6.

Further, the lower shell 12 has formed in the main side thereof a circular drive opening 22 contiguous to the access opening 21 and through which a disc table (not shown) of a disc drive mechanism of the recorder/player is allowed to enter the cartridge body 6, as shown in FIG. 6.

As shown in FIG. 6, the lower shell 12 has formed near the center of the bottom thereof a compartment 23 defined by an annular projection 24, in which a chucking plate 10 is provided to clamp and hold the optical disc 5 at a center hole 9 thereof on the disc table of the recorder/player. The chucking plate 10 is formed from a magnetic metal such as stainless steel or the like to have a generally disc-like shape. It may be formed from iron and plated with nickel, chrome or the like or painted for rust prevention.

The aforementioned upper and lower shells 11 and 12 are assembled and joined to each other by ultrasonic welding for example. Alternatively, the upper and lower shells 11 and 12 may be designed so that they can be joined to each other with fixing screws driven, through prepared holes formed near corners of the main side, for example, of one of the shells, into screw holes formed in corresponding corners of the main side of the other shell and opposite to the prepared holes in the other shell.

Also, as shown in FIGS. 2, 4 and 5, the cartridge body 6 has provided thereon a shutter plate 25 provided thereon movably in directions of arrow $a_1$ and $a_2$ being opposite to each other widthwise of the cartridge body 6 to open and close the access opening 21 and drive opening 22, and a shutter open/close mechanism 26 to support the shutter plate 25 movably.

Figure 7:
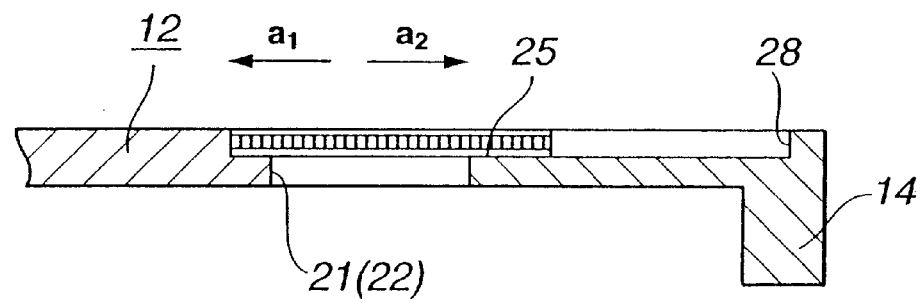
FIG. 7 is an axial sectional view for explanation of the shutter plate and concavity in which the shutter plate is moved.

The shutter plate 25 is made of a metal such as aluminum and formed flat to have a thickness of about 0.3 mm for example as shown in FIGS. 6 and 7. Note that the shutter plate 25 may be made of aluminum as the base and coated with Alumite or painted for rust prevention and decoration. Also, the shutter plate 25 may be formed by punching a thin sheet of stainless steel, polycarbonate, polystyrene, high-impact polystyrene, acryl styrol, acryl butyl styrol or the like, and its thickness is not limited to 0.3 mm but may appropriately be selected depending upon the material used.

As shown in FIGS. 3, 6 and 7, the shutter plate 25 is formed slightly larger than the access opening 21 and drive opening 22, and it is fixed at one end thereof to the shutter open/close mechanism 26.

As shown in FIGS. 5, 6 and 7, the cartridge body 6 has formed in the main side of the lower shell 12 a generally rectangular concavity 28 in which the shutter plate 25 is disposed movably. As shown in FIG. 7, the concavity 28 is formed to have an area a little larger than an area over which the shutter plate 25 is moved to open and close the access opening 21 and drive opening 22 and such a depth slightly larger than the thickness of the shutter plate 25 that the shutter plate 25 will not project from the main side of the cartridge body 6.

Figure 8:
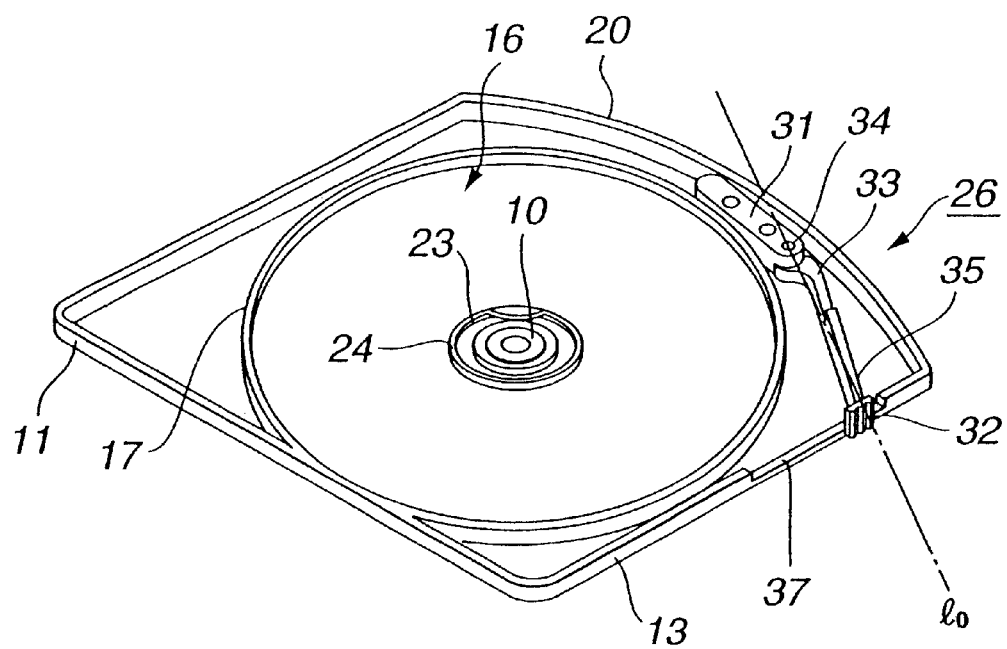
FIG. 8 is a perspective view for explanation of the shutter open/close mechanism.
Figure 9:
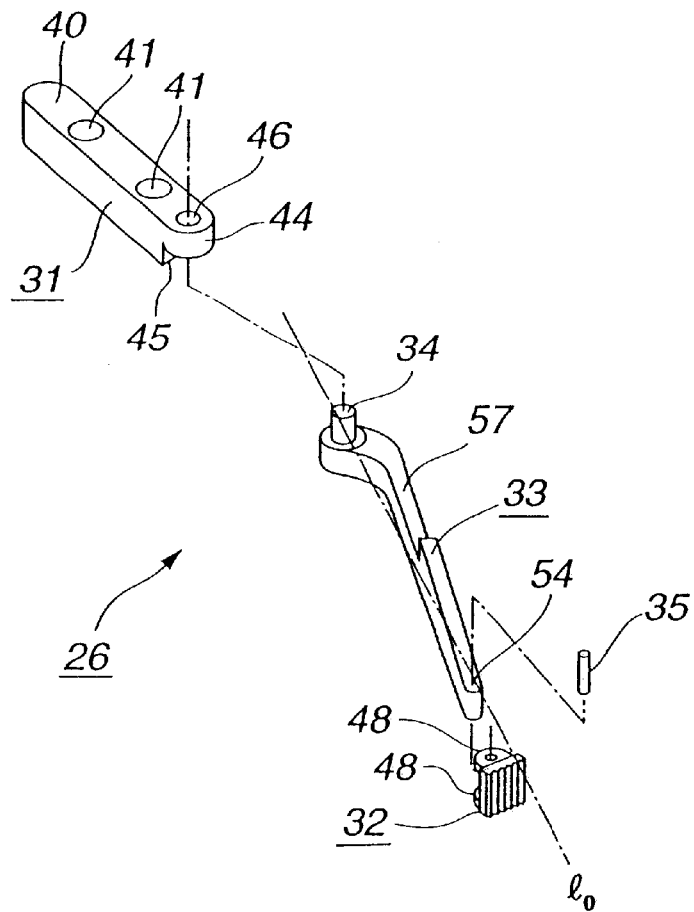
FIG. 9 is an exploded perspective view for explanation of the shutter open/close mechanism.

As will be seen from FIGS. 6, 8 and 9, the shutter open/close mechanism 26 is disposed in the inner space of the cartridge body 6, outside the upright walls 17 and 18 of the disc compartment 16. As shown, the shutter open/close mechanism 26 includes a guide member 31 to support the shutter plate 25, an operating member 32 to move the guide member 31, and a transmission member 33 linking the guide member 31 and operating member 32 to each other to transmit an operating force from the operating member 32 to the guide member 31.

Also, as shown in FIGS. 6, 8 and 9, the shutter open/close mechanism 26 includes a first pivot 34 to support the guide member 31 pivotably, a second pivot 35 to support the operating member 32 pivotably, a guide recess 36 to support the guide member 21 movably, and support surfaces 37 to support the operating member 32 movably.

As shown in FIGS. 8 and 9, the guide member 31 is formed from a thermoplastic synthetic resin such as polypropylene to have the shape of a block. The guide member 31 has formed on one side thereof a mount surface 40 to which the shutter member 25 is fixed at one end thereof with fixing screws 42 driven in screw holes 41 formed also in the mount surface 40.

Figure 10:
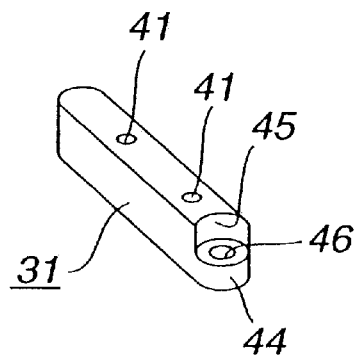
FIG. 10 is a perspective bottom view of a guide member of the shutter open/close mechanism.

As shown in FIGS. 9 and 10, the guide member 31 has one end thereof cut to about a half of its thickness to have a curved face 45 corresponding to one end of the transmission member 33. Thus the guide member 31 has an integral connecting end 44 to which the one end of the transmission member 33 is connected pivotably. The connecting end 44 has formed through it a pivot hole 46 through which the first pivot 34 is inserted, whereby the transmission member 33 is connected pivotably to the guide member 31.

Figure 11:
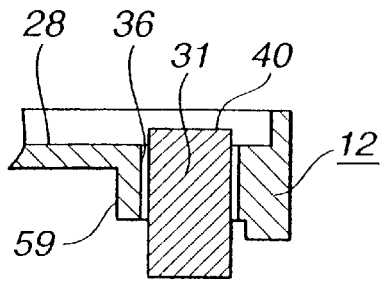
FIG. 11 is an axial sectional view for explanation of the guide member of the shutter open/close mechanism.

The guide member 31 is movably inserted in the guide recess 36 so as not to project from the concavity 28 to above the main side of the cartridge body 6, as shown in FIG. 11.

Figure 12:
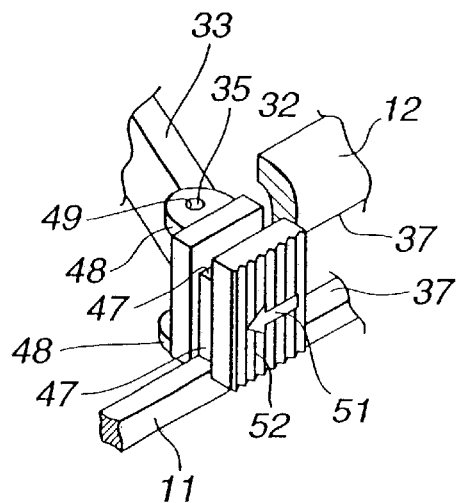
FIG. 12 is a perspective view for explanation of an open/close operation member of the shutter open/close mechanism.
Figure 13:
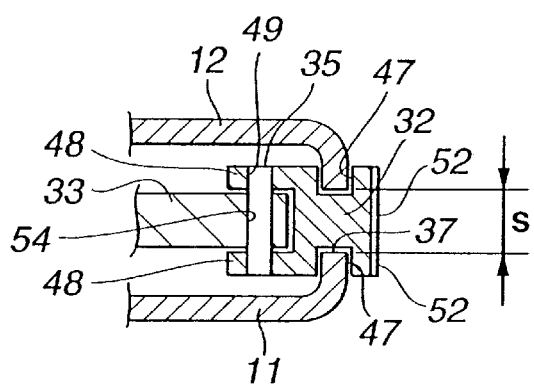
FIG. 13 is an axial sectional view of the open/close operation member.

As shown in FIGS. 9, 12 and 13, the operating member 32 is formed as a block having a generally rectangular shape. It is formed integrally with one end of the transmission member 33. The operating member 33 further has formed therein engagement recesses 47 in which the upper and lower shells 11 and 12 are pivotably engaged as shown in FIG. 11. Further, the operating member 32 has a pair of support pieces 48 formed integrally therewith and pivotably supported by the transmission member 33, as shown in FIGS. 12 and 13. These support pieces 48 have formed through them pivot holes 49 through which the second pivot 35 is pivotably be inserted.

The operating member 32 is disposed with its one end being placed outside the lateral side of the cartridge body 6, and there is provided on the end of the operating member 32 a marking 51 such as an arrow mark indicating the moving direction of the operating member 32 when the shutter member 25 is opened. Further, the operating member 32 has formed on the outer surface thereof recesses 52 which will prevent the user's finger from slipping when he moves the operating member 32 with the finger.

As shown in FIG. 9, the transmission member 33 has the first pivot 34 formed integrally with one end thereof that is connected to the guide member 31 and has formed in the other end thereof a pivot hole 54 through which the second pivot 35 is inserted. The transmission member 33 is pivotably supported with the second pivot 35 inserted through the pivot hole 54 being inserted at either end thereof through the pivot holes in the support pieces 48 of the operating member 32. Note that the second pivot 35 is formed from a stainless steel for example.

As shown in FIGS. 8 and 9, the transmission member 33 is formed at a portion thereof near the connecting end 44 of the guide member 31 generally circular convexly towards the upright walls 13 and 14 of the cartridge body 6 in relation to a straight line $l_0$ connecting the center of pivot of the first pivot 34 and that of the second pivot 35 to each other. As will be seen from FIGS. 8 and 14, since the portion of the transmission member 33 near the connecting end 44 of the guide member 31 is formed generally circular as in the above, an operating force applied longitudinally to the transmission member 33 when the shutter plate 25 is moved in the direction of arrow $a_1$ will act as a component force $f_1$ divided in a direction parallel to the moving direction of the guide member 31 which can thus be moved. Note that the transmission member 33 may be formed at a longitudinal middle part thereof to swell outwardly of the cartridge body 6.

Also, the transmission member 33 is cut as indicated with a reference 57 as shown in FIG. 9. The cut 57 is provided to prevent an interference between the guide recess 36 and a guide wall 59, which would otherwise take place, when the transmission member 33 is pivoted about either of the first and second pivots 34 and 35, thus permitting to assure a smooth operation of the transmission member 33.

Figure 14:
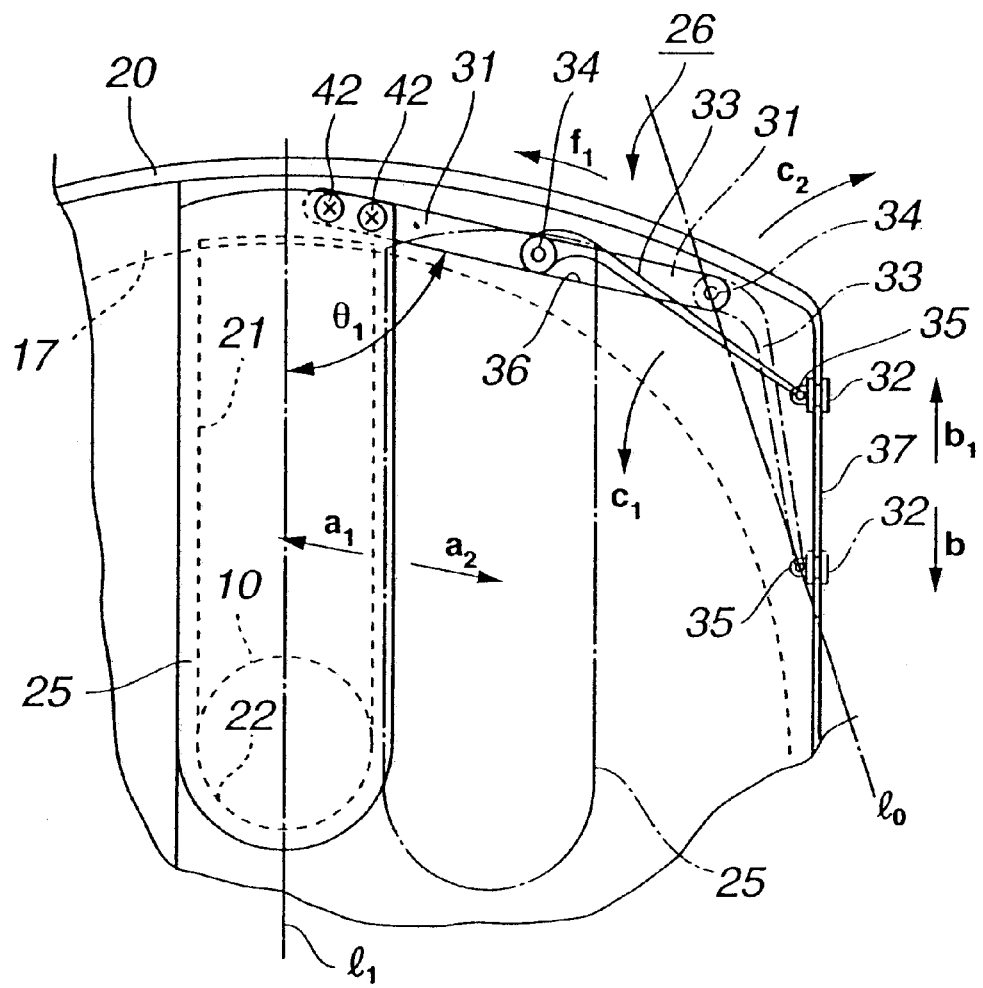
FIG. 14 is a plan view for explanation of the open/close operation of the shutter open/close mechanism.

As shown in FIGS. 6 and 14, the guide recess 36 is formed adjacent to the front end 20 of the lower shell 12 to be linear obliquely relative to the width of the cartridge body 6, perpendicular to the direction in which the disc cartridge is inserted into the recorder/player. That is, the guide recess 36 is formed with a predetermined inclination of $\theta_1$ smaller than 90° relative to a center line $l_1$ of the width of the cartridge body 6 as shown in FIG. 14. Also, the guide wall 59 sliding on the guide member 31 is integrally formed projected along the guide recess 36 as shown in FIG. 11. In the guide recess 36, there is movably inserted one lateral side of the guide member 31. The guide member 31 projects a little in the shutter moving concavity 28 of the lower shell 12. The guide recess 36 is formed to have a length being a sum of the length of the guide member 31 and the movement of the shutter member 25, which is slightly larger than the width of the access opening 21 and drive opening 22.

As shown in FIGS. 6, 12 and 13, each of the support surfaces 37 is formed on one lateral side of each of the upper and lower shells 11 and 12, parallel to the direction of insertion into the recorder/player, and a predetermined gap S is defined between the support surfaces 37 of the upper and lower shells 11 and 12. The thickness of the operating member 32 between the bottoms of the engagement recesses 47 is a predetermined one somewhat smaller than the gap S between the support surfaces 37 as shown in FIG. 13. Thus the operating member 32 receives the support surfaces 37 in the respective engagement recesses 47 thereof, and thus it is supported movably.

The operation of the shutter plate 25 by the shutter open/close mechanism 26 constructed as in the above will be described below with reference to the drawings:

As shown in FIG. 14, in the shutter open/close mechanism 26, when the shutter plate 25 is moved in the direction of arrow $a_2$ to open the access opening 21 and drive opening 22, the operating member 32 is moved in the direction of arrow $b_2$. As the operating member 32 is moved in the direction of arrow $b_2$, the end of the transmission member 33 is pivoted about the second pivot 35 in the direction of arrow $c_2$. Since the operating member 32 is thus moved in the direction of arrow $b_2$, the transmission member 33 is pivoted about the first pivot 34 to move the guide member 31 in the direction of arrow $a_2$. The guide member 31 is moved along the guide recess 36 until it abuts one end of the guide recess 36. Then the guide member 31 is stopped from being moved, and the shutter plate 25 is moved to a position where the access opening 21 and drive opening 22 are opened.

Also in the shutter open/close mechanism 26, as the shutter plate 25 is moved in the direction of arrow $a_1$ to close the access opening 21 and drive opening 22, the operating member 32 is moved in the direction of arrow $b_1$, as shown in FIG. 14.

Since the operating member 32 is thus moved in the direction of arrow $b_1$, the end of the transmission member 33 is pivoted about the second pivot 35 in the direction of arrow $c_1$. Also, since the transmission member 33 is thus pivoted about the second pivot 35, it is pivoted about the first pivot 34 to move the guide member 31 in the direction of arrow $a_1$. As the guide member 31 is moved along the guide recess 36 until it abuts one end of the guide recess 36 and thus stopped from being moved. Thus, the shutter plate 25 is moved to a position where it closes the access opening 21 and drive opening 22.

The transmission member 33 is pivoted about the second pivot 35 in the direction of arrow $c_1$ to transmit the operating force from the operating member 32 in the moving direction of the guide member 31. That is, the transmission member 33 can transmit the operating force in the moving direction of the guide member 31 since its end portion near the connecting end 44 of the guide member 31 is formed circular convexly outwardly of the cartridge body 6 (towards the upright walls 13 and 14) in relation to the straight line $l_0$.

In the above shutter open/close mechanism 26, since the transmission member 33 has the one end portion thereof thus formed circularly convexly outwardly of the cartridge body 6 as in the above, the shutter plate 25 is positively moved to open and close the access opening 21 and drive opening 22. Other shutter open/close mechanism in which the shutter plate 25 is inoperable will be described below with reference to FIG. 15. The same elements and portions in disc cartridge 1 and the other shutter open/close mechanism 61 shown in FIG. 15 as those in the embodiment having been described in the foregoing will be indicated with the same references for the convenience of illustration and will not be described any further.

Figure 15:
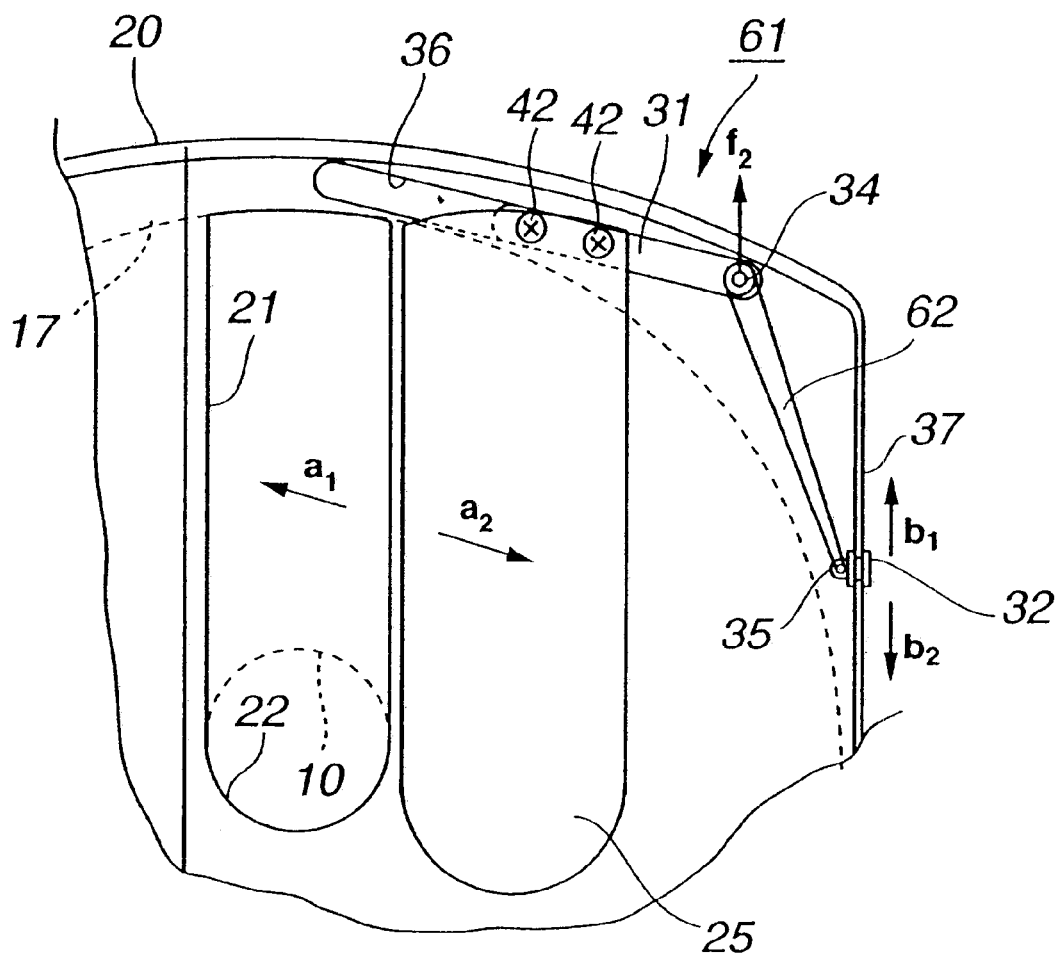
FIG. 15 is a plan view for explanation of a problem in open/close operation of a variant of the shutter open/close mechanism.

In FIG. 15, there is shown a shutter open/close mechanism 61 provided with a transmission member 62 formed to have a straight shape. The transmission member 62 has formed integrally with one end thereof the first pivot 34 which is to be connected to the guide member 31, and formed through the other end thereof the pivot hole 54 in which the second pivot 35 is to be supported.

Since the transmission member 62 is formed linear as shown in FIG. 15, when the operating member 32 is moved in the direction of arrow $b_1$, an operating force applied to the operating member 32 will act only as an operating force $f_2$ directed outwardly of the cartridge body 6, not resulting in an operating force to move the guide member 31 in the direction of arrow $a_1$. Thus, the shutter open/close mechanism 61 is not possible to operate the shutter plate 25 for opening and closing the access and drive openings.

That is, in the shutter open/close mechanism 61, the transmission member 62 should have at least a part thereof formed swelling outwardly of the cartridge body 6 in relation to the straight line $l_0$ in order to operate (open and close) the shutter plate 25.

In the disc cartridge 1 constructed as in the above, the shutter plate 25 is operated by the shutter open/close mechanism 26 to open and close the access opening 21 and drive opening 22 as will be described below with reference to the accompanying drawings:

First, the disc cartridge 1 is set into the cartridge loader in the recorder/player with the access opening 21 and drive opening 22 being closed by the shutter plate 25 as shown in FIG. 3.

When the disc cartridge 1 is set in the cartridge loader, the shutter operator (not shown) of the recorder/player will move the operating member 32 of the shutter open/close mechanism 26 in the direction of arrow $b_2$. As shown in FIGS. 3, 4 and 14, as the operating member 32 in the shutter open/close mechanism 26 is thus moved in the direction of arrow $b_2$, the transmission member 33 is moved longitudinally to move the guide member 31 along the guide recess 36 in the direction of arrow $a_2$. Since the guide member 31 is thus moved in the direction of arrow $a_2$, the shutter plate 25 is moved in the direction of arrow $a_2$ to open the access opening 21 and drive opening 22.

Then, the disc table of the disc rotation drive mechanism of the recorder/player enters the disc cartridge 1 from the drive opening 22 to drive the optical disc 5, while the optical pickup of the recorder/player enters the disc cartridge 1 from the access opening 21 to write and read information to and from the optical disc 5.

As having been described in the foregoing, the guide recess formed in the main side of the cartridge body 6 to be oblique relative to the width of the cartridge body 6 in the disc cartridge 1 allows to freely shape the front end 20 of the cartridge body 6, at which the disc cartridge 1 is first inserted into the recorder/player. Thus, since it is possible to easily know the correction direction of inserting the cartridge 6 into the recorder/player, the disc cartridge 1 cannot be inserted in any wrong direction into the recorder/player.

Also, in the shutter open/close mechanism 26 of the disc cartridge 1, since the transmission member 33 is provided as pivotably connected to the guide member 31 and operating member 32 by means of the first and second pivots 34 and 35, the shutter plate 25 can be moved positively to open and close the access opening 21 and drive opening 22.

Further, since the shutter open/close mechanism 26 is located outside the upright walls 17 and 18 of the disc compartment 16 and in the pace isolated from the disc compartment 16, abrasion powder produced as the guide member 31, operating member 32 and transmission member 33 are slid repeatedly is prevented to come into the disc compartment 16, whereby information can be written and read to and from the optical disc 5 with a highly improved reliability.

Figure 16:
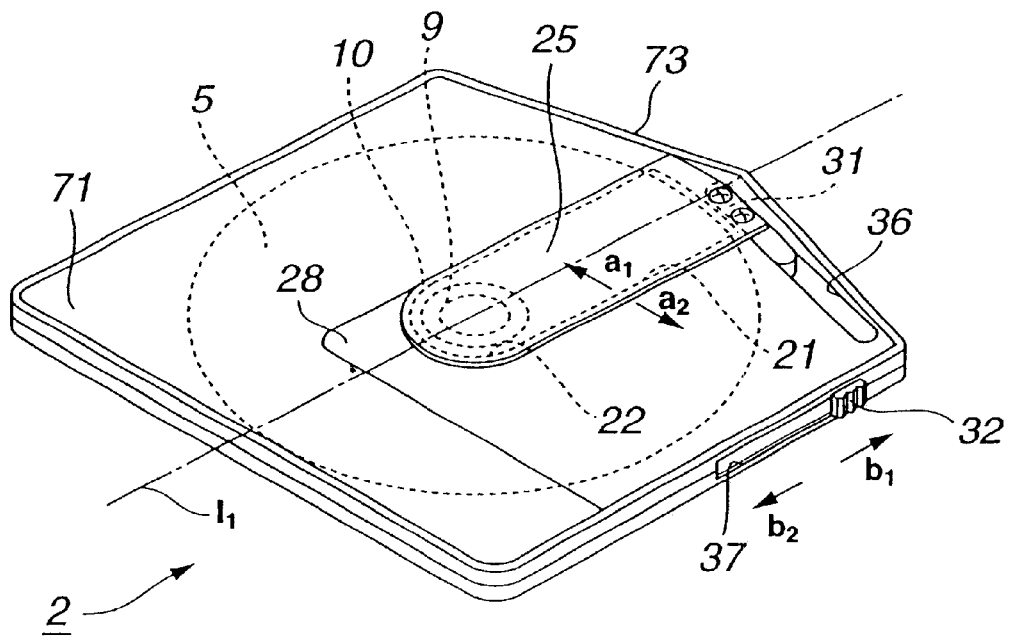
FIG. 16 is a perspective view of a variant of the disc cartridge according to the present invention.

Note that the front end 20 of the aforementioned disc cartridge 1 is formed circular convexly in relation to the recorder/player but may of course be formed in any other shape as shown in FIG. 16 for example. This variant of the disc cartridge according to the present invention, having the front end thereof formed otherwise than in the above, will briefly be described below with reference to FIG. 16. The same elements and portions in this variant shown in FIG. 16 as those in the disc cartridge 1 having been described in the foregoing will be indicated with the same references for the convenience of illustration and will not be described any further.

As shown in FIG. 16, the other disc cartridge 2 is only different from the aforementioned embodiment in that the cartridge body 71 has the front end 73 thereof formed generally symmetrically triangular with respect to the center line 11 of the width of the cartridge body 71. Therefore, owing to this front end shape, the user can easily know visually and by touching the correct direction of inserting the disc cartridge 2 into the reorder/player.

In the aforementioned disc cartridges 1 and 2, the front ends 20 and 73 are formed symmetrically circular and/or polyhedral with respect to the center line $l_1$ of the width of the cartridge bodies 6 and 71 but the front end may be formed asymmetrical with respect to the center line $l_1$.

Figure 17:
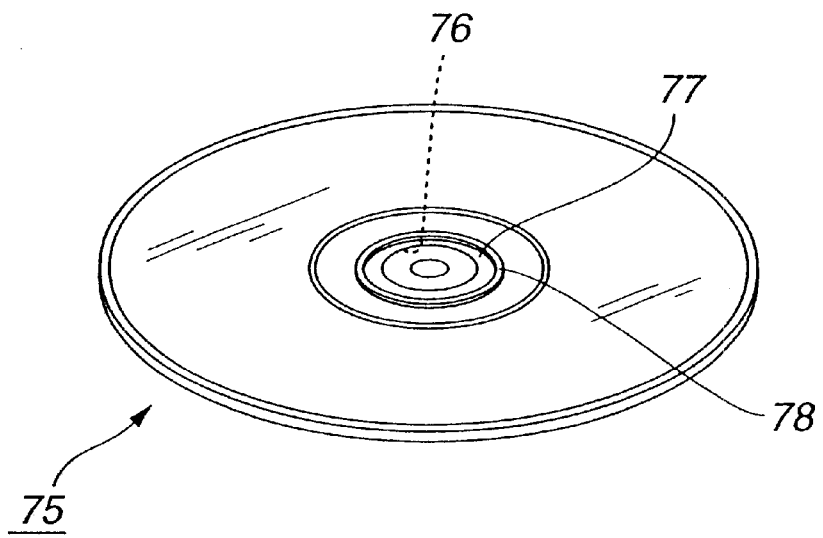
FIG. 17 is a perspective view of another variant of the disc cartridge according to the present invention.

Also, in the above disc cartridges 1 and 2, the cartridge bodies 6 and 71 have the compartment 23 defined by the annular projection 24, in which the chucking plate 10 is provided to hold the optical disc 5. However, it should be noted that as shown in FIG. 17, there may be fixed over a center hole 76 of an optical disc 75 a chucking plate 77 around which an annular projection 78 is formed.

In the disc cartridges 1 and 2, the shutter plate 25 is provided exposed to outside. However, a shutter cover may be provided to cover the moving range of the shutter plate 25. This variant of the disc cartridge according to the present invention will be described below with reference to the accompanying drawings. Note that the same elements in this second variant in FIGS. 18 and 19 as those in the disc cartridges 1 and 2 will be indicated with the same references as in the aforementioned disc cartridges 1 and 2 and will not be described any further.

Figure 18:
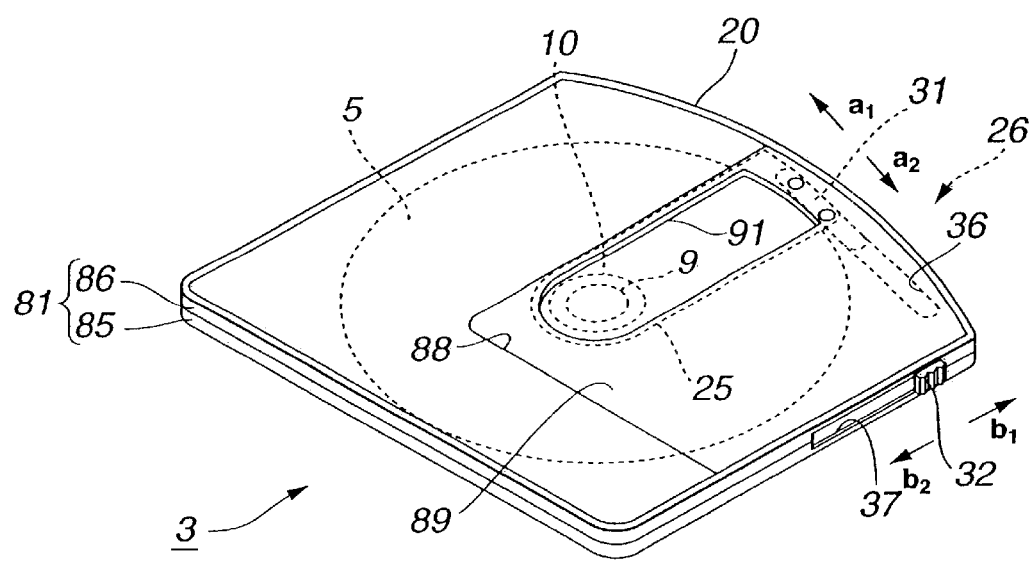
FIG. 18 is a perspective view of still another variant of the disc cartridge according to the present invention.
Figure 19:
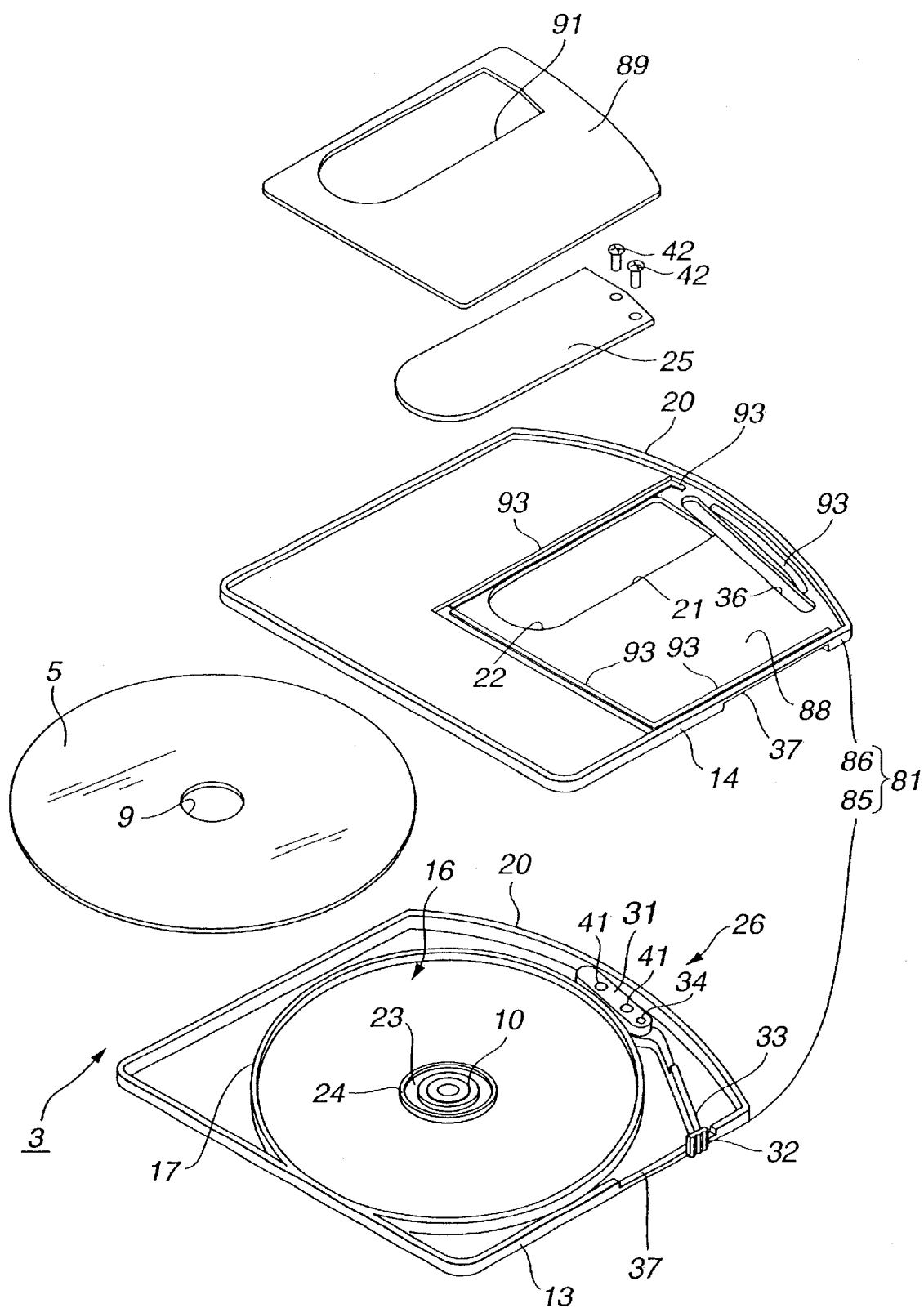
FIG. 19 is an exploded perspective view of the disc cartridge in FIG. 18.

As shown in FIGS. 18 and 19, the variant of the disc cartridge is generally indicated with a reference 3, and includes a cartridge body 81 formed from a set of upper and lower shells 85 and 86. In the cartridge body 81, the upper shell 85 has formed thereon a concavity 88 in which the shutter plate 25 is movable, as shown in FIGS. 18 and 19. Further, the disc cartridge 3 includes a shutter cover 89 to cover the concavity 88 as shown in FIGS. 18 and 19.

The concavity 88 in which the shutter plate 25 is movable is slightly larger in area than the moving range of the shutter plate 25 moving over the access opening 21 and drive opening 22 and deeper than the thickness of the shutter plate 25 so that the latter will not protrude to above the main side of the cartridge body 81.

The shutter cover 89 is formed from a resin such as polycarbonate or a metal such as stainless steel, aluminum or the like to be generally rectangular and flat. The shutter cover 89 is 0.2 to 0.5 mm thick. As shown in FIGS. 18 and 19, the shutter cover 89 has an opening 91 formed in the main side thereof and in a position corresponding to the access opening 21 and drive opening 22. The opening 91 is somehow larger in area than the access and drive openings 21 and 22 and slightly smaller in area than the shutter plate 25.

The shutter cover 89 is attached in the concavity 88 with an adhesive tape 93 having an adhesive layer on either side thereof or an adhesive applied on the inner side thereof facing the bottom of the concavity 88 along the peripheral edge thereof. The adhesive tape 93 has a predetermined thickness which will assure a predetermined gap in which the shutter plate 25 can be moved inside the concavity 88. The shutter cover 89 thus attached in the concavity 88 covers the moving range of the shutter plate 25 and guide recess 36 of the shutter open/close mechanism 26.

In the above disc cartridge 3, since the shutter cover 89 is provided as in the above to cover the moving range of the shutter plate 25, it is possible to prevent dust from coming into the cartridge body 81 from the clearance between the shutter plate 25 and cartridge body 81 when the shutter plate 25 is covering the access opening 21 and drive opening 22. Also in the disc cartridge 3, since the guide recess 36 is covered by the shutter cover 89, it is possible to prevent dust from coming into the cartridge body 81 from the guide recess 36. Therefore, in the disc cartridge 3, information can be written or read to or from the magneto-optical disc 5 with an improved reliability.

The aforementioned disc cartridges 1, 2 and 3 are designed such that the optical pickup approaches the optical disc through the access opening 21. However, it is should be noted that there may be provided in a position opposite to the access opening 21 another access opening through which a magnetic field application head or the like comes in and another shutter plate to open and close the access opening.

What is claimed is:

1. A disc cartridge comprising:

a disc-shaped recording medium;

a cartridge body having formed therein a disc compartment to house the disc-shaped recording medium;

an access opening formed in the cartridge body and through which a part of the recording area of the disc-shaped recording medium, extending between lead-in and lead-out areas, is exposed to outside for data read and write;

a shutter member provided movably to open and close the access opening; and a shutter open/close mechanism having a guide recess to support the shutter member movably;

the guide recess of the shutter open/close mechanism being formed on a main side of the cartridge body to be oblique relative to the width of the cartridge body;

the shutter open/close mechanism including:

a guide member supporting the shutter member and movably engaged in the guide recess;

an operating member to move the guide member;

a transmission member linking the guide member and the operating member to each other to transmit an operating force from the operating member to the guide member; and support surfaces formed on the cartridge body to support the operating member movably; and the transmission member being pivotably connected to the guide member and/or operating member.

2. The disc cartridge as set forth in claim 1, wherein the transmission member is pivotably connected to the guide member and/or operating member by means of pivots.

3. The disc cartridge as set forth in claim 2, wherein the transmission member is pivotably connected to the guide member and the operating member by means of a first pivot and a second pivot; and the transmission member has a part of its longitudinal middle portion, formed swelling outwardly of the cartridge body in relation to a straight line connecting the first pivot and the second pivot.

4. The disc cartridge as set forth in claim 2, wherein the transmission member is pivotably connected to the guide member and the operating member by means of a first pivot and a second pivot; and the transmission member has a part near an end thereof connected to the guide member, formed circular convexly outwardly of the cartridge body in relation to a straight line connecting the first pivot and the second pivot.

5. The disc cartridge as set forth in claim 1, wherein the operating member is disposed on a lateral side of the cartridge body, generally perpendicular to the moving direction of the shutter member.

6. The disc cartridge as set forth in claim 1, wherein the transmission member and the guide member are moved in directions generally perpendicular to each other, respectively.

* * * * *